US007418339B2

(12) United States Patent
Liu et al.

(10) Patent No.: US 7,418,339 B2
(45) Date of Patent: Aug. 26, 2008

(54) METHOD FOR INITIATING NAVIGATION GUIDANCE IN A DISTRIBUTED COMMUNICATIONS SYSTEM

(75) Inventors: Kungwel Mike Liu, Chandler, AZ (US); Parvathy Bhaskaran, Mesa, AZ (US); Richard M. Clayton, Phoenix, AZ (US); Garurank P. Saxena, Chandler, AZ (US); Juan C. Uribe, Chandler, AZ (US); Bernhard P. Weisshaar, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 495 days.

(21) Appl. No.: 11/058,736

(22) Filed: Feb. 14, 2005

(65) Prior Publication Data
US 2006/0184315 A1    Aug. 17, 2006

(51) Int. Cl.
*G01C 21/30* (2006.01)
*G01C 21/32* (2006.01)

(52) U.S. Cl. ............... 701/208; 701/202; 701/209; 701/201; 340/995.19; 340/995.23; 340/995.24; 340/989; 340/991; 342/457

(58) Field of Classification Search ......... 340/995.1, 340/995.19, 995.24, 995.23, 995.2, 989, 340/991, 993; 701/200, 207, 202, 208–209; 715/854, 866; 342/457
See application file for complete search history.

(56) References Cited

U.S. PATENT DOCUMENTS

| | | | | |
|---|---|---|---|---|
| 5,068,656 A | * | 11/1991 | Sutherland | 340/989 |
| 5,398,189 A | * | 3/1995 | Inoue et al. | 701/211 |
| 5,410,485 A | * | 4/1995 | Ichikawa | 701/209 |
| 5,515,284 A | * | 5/1996 | Abe | 701/202 |
| 5,612,881 A | * | 3/1997 | Moroto et al. | 701/209 |
| 5,784,059 A | * | 7/1998 | Morimoto et al. | 715/854 |

(Continued)

FOREIGN PATENT DOCUMENTS

CN     101001409 A.    * 7/2007

(Continued)

OTHER PUBLICATIONS

Synchronized sampling and phasor measurements for relaying and control, Phadke, A.G et al. Power Delivery, IEEE Transactions on, vol. 9, Issue 1, Jan. 1994 pp. 442-452, Digital Object Identifier 10.1109/61.277716.*

(Continued)

*Primary Examiner*—Cuong H. Nguyen
(74) *Attorney, Agent, or Firm*—Ingrassia, Fisher & Lorenz, P.C.

(57) ABSTRACT

A method is provided for improved navigation guidance in a portable navigation device (104) having a first navigation operating mode (302) for requesting (318, 324) and receiving (326, 334) routelet data and navigation route data and operating in accordance with the routelet data (332) and a second operation navigation mode (304) for operating in accordance with the navigation route data (338). The method includes in the first navigation operating mode (302), the steps of transmitting a routelet request (318) comprising location data, speed data and direction data, the location, speed and direction data determined (312, 314 316) in response to a present location, a present speed and a present direction of travel, respectively, of the portable navigation device (104), receiving routelet data (326) and operating in accordance with the received routelet data (332).

11 Claims, 5 Drawing Sheets

U.S. PATENT DOCUMENTS

| | | | | |
|---|---|---|---|---|
| 5,970,481 A * | 10/1999 | Westerlage et al. | | 705/417 |
| 6,128,571 A * | 10/2000 | Ito et al. | | 701/201 |
| 6,133,947 A * | 10/2000 | Mikuni | | 348/143 |
| 6,169,515 B1 * | 1/2001 | Mannings et al. | | 342/357.1 |
| 6,208,932 B1 * | 3/2001 | Ohmura et al. | | 701/200 |
| 6,292,745 B1 * | 9/2001 | Robare et al. | | 701/208 |
| 6,321,158 B1 * | 11/2001 | DeLorme et al. | | 701/201 |
| 6,415,224 B1 * | 7/2002 | Wako et al. | | 701/208 |
| 6,421,602 B1 | 7/2002 | Bullock et al. | | |
| 6,430,500 B1 * | 8/2002 | Kubota et al. | | 701/209 |
| 6,571,169 B2 * | 5/2003 | Miyaki | | 701/200 |
| 6,600,994 B1 * | 7/2003 | Polidi | | 701/209 |
| 6,665,610 B1 * | 12/2003 | Correia et al. | | 701/209 |
| 6,707,421 B1 * | 3/2004 | Drury et al. | | 342/357.1 |
| 6,807,483 B1 * | 10/2004 | Chao et al. | | 701/210 |
| 6,812,888 B2 * | 11/2004 | Drury et al. | | 342/357.13 |
| 6,873,905 B2 * | 3/2005 | Endo et al. | | 701/202 |
| 6,978,208 B2 * | 12/2005 | Endo et al. | | 701/202 |
| 2003/0191580 A1 * | 10/2003 | Endo et al. | | 701/202 |
| 2004/0024522 A1 * | 2/2004 | Walker et al. | | 701/210 |
| 2004/0078139 A1 | 4/2004 | Kornhauser et al. | | |
| 2004/0204829 A1 * | 10/2004 | Endo et al. | | 701/202 |
| 2006/0184315 A1 * | 8/2006 | Liu et al. | | 701/202 |
| 2007/0276596 A1 * | 11/2007 | Solomon et al. | | 701/211 |

FOREIGN PATENT DOCUMENTS

| | | |
|---|---|---|
| EP | 1329693 | 7/2003 |
| EP | 1853879 A1 * | 11/2007 |
| GB | 2384354 A * | 7/2003 |
| JP | 2004319326 A * | 11/2004 |
| JP | 2005181262 A * | 7/2005 |
| JP | 2007045338 A * | 2/2007 |
| WO | WO 9906898 A1 * | 2/1999 |

OTHER PUBLICATIONS

Archeoguide: an augmented reality guide for archaeological sites, Vlahakis, V. et al.; Computer Graphics and Applications, IEEE vol. 22, Issue 5, Sep.-Oct. 2002 pp. 52-60, Digital Object Identifier 10.1109/MCG.2002.1028726.*

Mobile workers: access to information on the move, Miah, T.; Bashir, O.; Computing & Control Engineering Journal vol. 8, Issue 5, Oct. 1997 pp. 215-223.*

The mobile transportation information service system, Yonghua Zhou; Huapu Lu; Systems, Man and Cybernetics, 2005 IEEE International Conference on, vol. 3, Oct. 10-12, 2005 pp. 2218-2223 vol. 3 , Digital Object Identifier 10.1109/ICSMC.2005.1571478.*

A privacy enhanced service architecture for mobile users, Bessler, S.; Jorns, O.; Pervasive Computing and Communications Workshops, 2005. PerCom 2005 Workshops. Third IEEE International Conference on, Mar. 8-12, 2005 pp. 125-129 Digital Object Identifier 10.1109/PERCOMW.2005.11.*

Personal information guide—a platform with location based service for mobile powered e-commerceHerden, S.; Mkrtchyan, A.; Rautenstrauch, C.; Zwanziger, A.; Schenk, M.;Database and Expert Systems Applications, 2003. Proceedings. 14th International Workshop on Sep. 1-5, 2003 pp. 895-900 Digital Object Identifier 10.1109/DEXA.2003.1232135.*

Efficient Goal Directed Navigation using RatSLAM; Milford, M.; Wyeth, G.; Prasser, D.; Robotics and Automation, 2005, ICRA 2005. Proceedings of the 2005 IEEE International Conference on Apr. 18-22, 2005 pp. 1097-1102.*

A location aware mobile tourist guide selecting and interpreting sights and services by context matching Hagen, K.; Modsching, M.; Kramer, R.; Mobile and Ubiquitous Systems: Networking and Services, 2005. MobiQuitous 2005. The Second Annual International Conference on Jul. 17-21, 2005 pp. 293-301; Digital Object Identifier 10.1109/MOBIQUIT.*

Busview: a graphical transit information system; Maclean, S.D.; Dailey, D.J.; Intelligent Transportation Systems, 2001. Proceedings. 2001 IEEE Aug. 25-29, 2001 pp. 1073-1078; Digital Object Identifier 10.1109/ITSC.2001.948811.*

Sumitomo electric's navigation systems for private automobiles; Ikeda, H.; Kobayashi, Y.; Kawamura, S.; Nobuta, H.;Vehicle Navigation and Information Systems Conference, 1991; vol. 2, Oct. 20-23, 1991 pp. 451-462.*

Campbell, Andrew, et al., Spawning Networks, IEEE Networks, pp. 16-29 Jul./Aug. 1999.

* cited by examiner

METHOD FOR INITIATING NAVIGATION GUIDANCE IN A DISTRIBUTED COMMUNICATIONS SYSTEM

FIELD OF THE INVENTION

The present invention generally relates to navigation guidance, and more particularly relates to initiating navigation in a distributed, off-board navigation guidance system.

BACKGROUND OF THE INVENTION

Off-board navigation guidance systems are distributed computation systems which include a remote navigation guidance device, such as a remote server, for handling the majority of the computational effort and a portable navigation device, such as an in-vehicle device or other portable wireless device, which is wirelessly connected to the remote server. One such system is described in U.S. Pat. No. 6,421,602, assigned to the assignee of the present invention. Conventional navigation systems download route data for only a single route from a route start location to a destination location. When the portable navigation device is moving, its position changes between the time the navigation route is requested and the time the navigation route data is received by the portable navigation device. The portable navigation device may move a large distance during route download, and may in fact pass or have traveled away from or in another direction from the route, thus being located away from the route start location. If this happens, the entire route becomes useless and the portable navigation device must request a new route.

Existing navigation guidance systems may also provide a route from the route start location which may not even be available or accessible to the user of the portable navigation device. This can occur in vehicle applications where the vehicle is in a parking lot or on a school campus and the beginning of the route downloaded starts on a street that is not accessible from the parking lot or campus, or a median prevents the vehicle from turning on a street in the direction given by the route. One solution requires downloading of route data with a tree of various optional routing to initiate the route or to maintain the route. Typically, the amount of data downloaded over the wireless connection is directly related to the cost of providing the route data. Thus, prior art methods which require download of route data with a tree of various optional routing are costly and much of the data transmitted will never be used.

Thus, what is needed is a method for timely and efficiently providing relevant routing data for route initiation and route maintenance. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method is provided for improved navigation guidance in a portable navigation device having a first navigation operating mode for requesting and receiving routelet data and navigation route data and operating in accordance with the routelet data and a second operation navigation mode for operating in accordance with the navigation route data. The method includes in the first navigation operating mode, the steps of transmitting a routelet request comprising location data, speed data and direction data, the location, speed and direction data determined in response to a present location, a present speed and a present direction of travel, respectively, of the portable navigation device, receiving routelet data and operating in accordance with the received routelet data.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
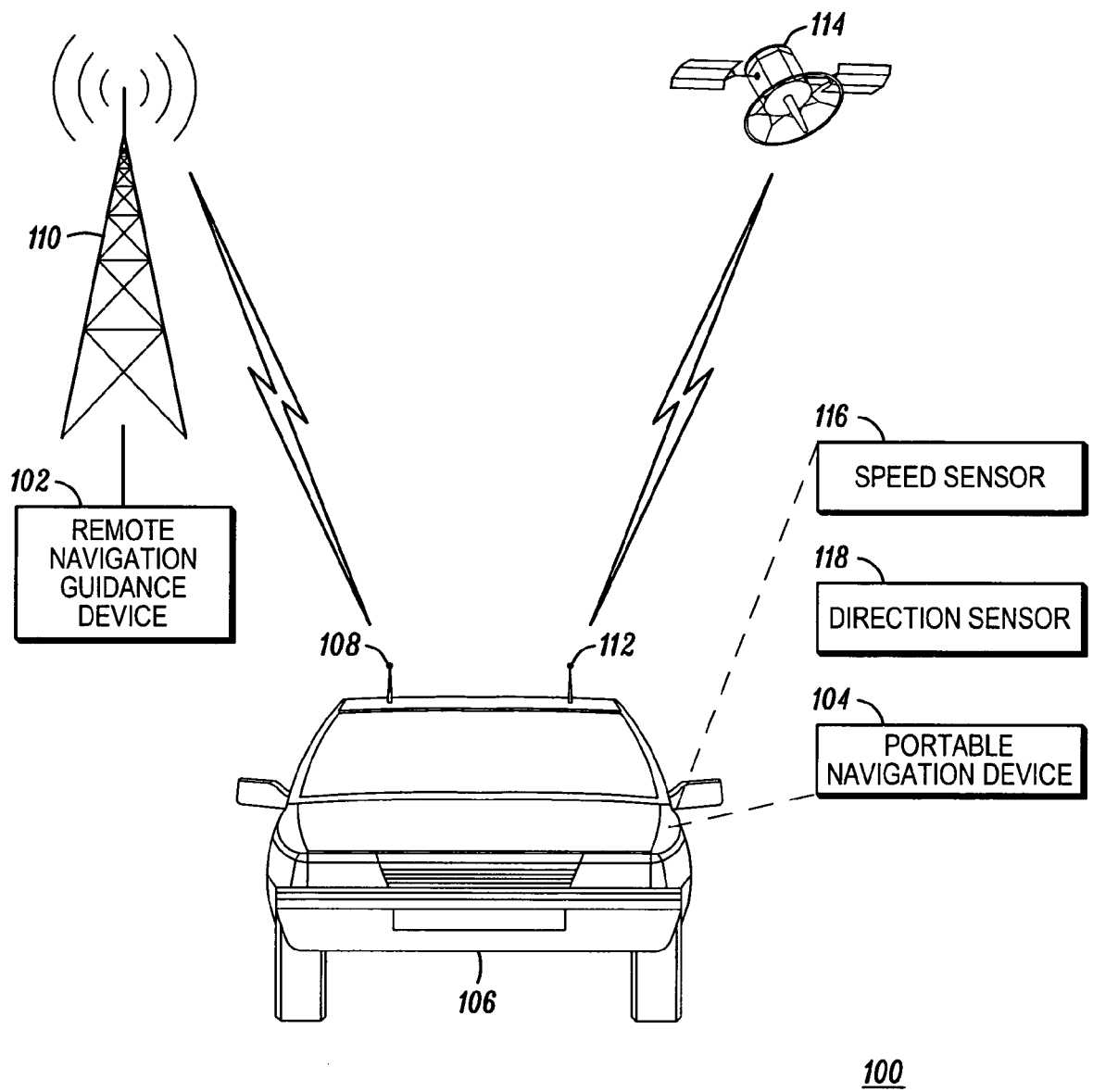
FIG. 1 is a diagram of a navigation guidance system in accordance with an embodiment of the present invention.

FIG. 1 depicts an off-board navigation guidance system 100 which is a distributed computation system including a remote navigation guidance device 102, such as a remote server, for handling the majority of the computational effort and a portable navigation device 104, such as an in-vehicle device or other portable wireless device. The portable navigation device 104 is shown mounted in a vehicle 106. While an automobile vehicle 106 is shown for exemplary purposes, the portable navigation device could be mounted in or on any movable vehicle, including mounted on a person. The portable navigation device 104 is wirelessly connected to the remote server 102 through an antenna 108 coupled to portable navigation device 104. The antenna 108 is wirelessly coupled to a stationary antenna 110. The stationary antenna 110 could be dedicated to the navigation guidance system 100 or could be part of a cellular system or some other communication system to which the remote server 102 is coupled for receiving communication from and transmitting communication through.

The portable navigation device 104 is coupled to an antenna 112 for receiving global positioning signals from Global Positioning System satellites 114 to determine the location of the portable navigation device 104. The portable navigation device 104 is also coupled to a speed sensor 116 and a direction sensor 118, such as a compass, for receiving signals to determine the speed and direction of travel of the portable navigation device 104.

Figure 2:
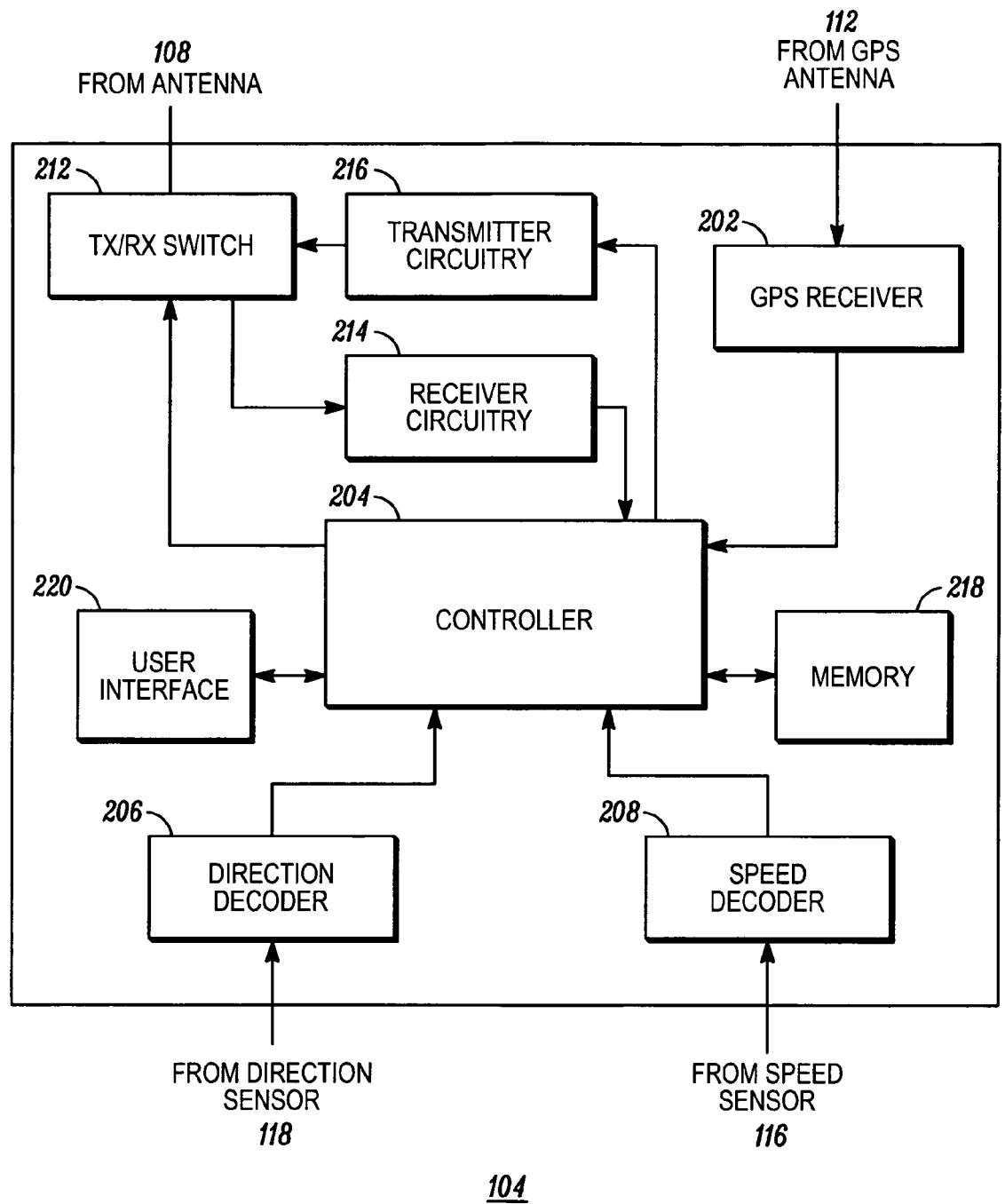
FIG. 2 is a block diagram of a portable navigation device of the navigation guidance system of FIG. 1 in accordance with the embodiment.

Referring to FIG. 2, the portable communication device 104 includes a GPS receiver 202 coupled to the GPS antenna 112 for receiving and decoding GPS signals received from the Global Positioning System satellites 114 (FIG. 1) to generate location information indicating a present location of the portable navigation device 104. The GPS receiver 202 provides the location information to a controller 204 for utilization thereby. The portable navigation device 104 also includes a direction decoder 206 and a speed decoder 208. The direction decoder 206 is coupled to the direction sensor 118 (FIG. 1) for receiving signals therefrom and decoding those signals to generate direction information. The speed decoder 208 is coupled to the speed sensor 116 (FIG. 1) for receiving signals therefrom and decoding those signals to generate speed information. The direction decoder 206 and the speed decoder 208 are coupled to the controller 204 for providing the direction information and the speed information thereto for utilization thereby.

Antenna 108 (FIG. 1) is coupled to receive/transmit switch 210 for coupling and uncoupling receiver circuitry 212 and transmitter circuitry 214 thereto when antenna 108 is receiving and transmitting radio frequency (RF) signals. The receive/transmit switch 210 selectively couples the antenna 108 to the receiver circuitry 212 and the transmitter circuitry 214 in a manner familiar to those skilled in the art. The receiver circuitry 212 demodulates and decodes the RF signals to derive information therefrom and is coupled to the controller 204 for providing the decoded information thereto for utilization thereby in accordance with the function(s) of the portable navigation device 104. The controller 204 also provides information to the transmitter circuitry 214 for encoding and modulating such information into RF signals for transmission from the antenna 108.

The controller 204 is coupled to a nonvolatile memory device 218 for storing information therein and for retrieving information therefrom. The controller 204 is also coupled to user interface 220 for receiving inputs from a user or providing information to a user. The user interface could comprise one or all of a microphone, a keypad, a touchscreen input device, user selectable key inputs, indicators such as light emitting diodes (LEDs) or bulbs, a speaker, a display, or any other interface elements utilizable by the particular applications of the portable navigation device 104.

Figure 3:
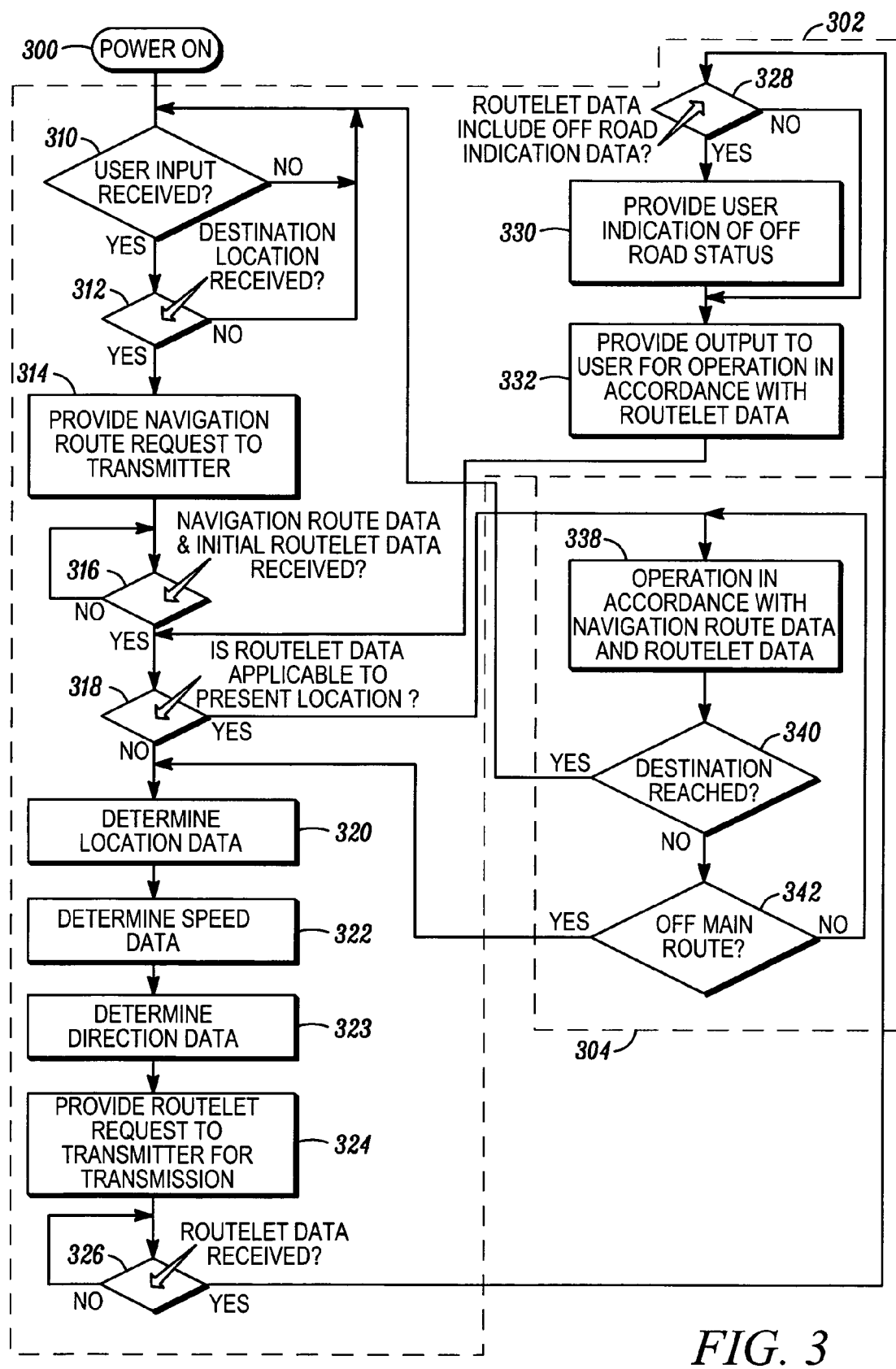
FIG. 3 is a flow diagram of the operation of the portable navigation device of FIG. 2 in accordance with the embodiment.

Referring to FIG. 3, a flowchart of the operation of the controller 204 in accordance with the embodiment of the present invention begins when the portable navigation device 104 is powered "ON" 300. The portable navigation device 104 has a first navigation operating mode 302 for requesting and receiving routelet data and navigation route data and operating in accordance with the routelet data and a second operation navigation mode 304 for operating in accordance with the navigation route data. The first navigation operating mode 302 is a "conversational" operating mode whereby the portable navigation device 104 requests and the remote navigation device 102 generates and sends small packets of navigation information called "routelets" to overcome the drawbacks of the prior art during initial maneuvering. For example, the present invention advantageously provides the portable navigation device 104 navigation route data and an abbreviated number of initial routelet data to permit quicker and less expensive download of navigation information. If the initial routelet data is insufficient to allow the vehicle to begin moving toward a main route described by the navigation route data, additional routelet data is requested to begin vehicle movement. In particular, when a vehicle with a portable navigation device 104 is off road in a parking lot or on a school or hospital campus, the present invention provides routelet data to the portable navigation device 104 to begin navigating the vehicle to the nearest road segment.

Referring back to FIG. 3, in operation, the controller 204 initially awaits reception of a user input 310 from the user interface 220 (FIG. 2). When a user input is received 310 indicating that the portable navigation device 104 is to begin navigation operations, processing determines whether a destination location has been received 312 from a user via the user interface 220 (FIG. 2). When a destination location has been received 312, a navigation route request including location data determined in response to the present location of the portable navigation device and the destination location is constructed by the controller 204 as is known to those skilled in the art and is provided 314 to the transmitter circuitry 216 (FIG. 2) for transmitting the navigation route request from the portable navigation device 104. Processing then awaits reception of navigation route data 316 describing a main route from a route start location, determined in response to the location data transmitted as part of the navigation route request, to the destination location. In accordance with the present invention, along with the navigation route data describing the main route, initial routelets are also received 316.

The present invention next determines whether the received initial routelet data is applicable to the present location 318. For example, the portable navigation device could have moved a substantial distance or changed directions between the time the navigation route request was transmitted 314 and the time the navigation route data was received 316.

If the received initial routelet data is not applicable to the present location 318, the controller 204 determines location data 320 in response to a present location of the portable navigation device 104 as indicated by location information received from the GPS receiver 202. The controller 204 next determines speed data 322 in response to a present speed of the portable navigation device 104 as indicated by speed information received from the speed decoder 208 and then determines direction data 323 in response to a present direction of travel of the portable navigation device 104 as indicated by direction information received from the direction decoder 206. The controller 204 then constructs a routelet request including the location data, the speed data and the direction data and provides the routelet request 324 to the transmitter circuitry 216 (FIG. 2) for transmitting the routelet request from the portable navigation device 104.

Processing next awaits receipt of routelet data 326 via the receiver circuitry 214 (FIG. 2). When routelet data is received 326, the controller 204 determines whether the routelet data includes off road indication data 328. If the routelet data includes off road indication data 328, then the controller 204 signals the user interface 220 to provide a predetermined user indication of off road status 330. Such user indication could be activation of a particular visible indicator, such as a bulb, an LED or a predetermined display output. In accordance with the present invention, as will be described below, such user indication will be limited to off road situations where the vehicle is stationary or barely moving.

If the routelet data does not include off road indication data 328 or the user indication of off road status has been provided 330, then the controller 204 provides output to the user via the user interface 220 for operation in accordance with the routelet data 332. As is known to those skilled in the art, such output would describe a path for the user to navigate and could be provided to the user as a visual display or as verbal directions from a speaker.

If routelet data is not applicable to the present location 318, such as location data from the GPS receiver 202 indicates that the portable navigation device 104 is not on a route described by the routelet data or the routelet data does not intersect with a main route described by the received navigation route data, processing of the controller 204 returns to construct and transmit another routelet request 320, 322, 323, 324. The present invention, therefore, advantageously, continues to efficiently and timely provide relevant routing data in the form of routelet data for route initiation and route maintenance until the routelet data is applicable to the present location 318 to navigate the portable navigation device 104 to intersect the main route. If that the routelet data is applicable to the present location of the portable navigation device 104, operation of the portable navigation device 104 switches from the first navigation operating mode 302 to the second navigation operating mode 304.

In the second operation mode 304, the controller 204 provides output to the user via the user interface 220 for conventional operation in accordance with the navigation route data 338 until either the destination is reached 340 or location data from the GPS receiver 202 indicates that the portable navigation device is off the main route 342. When the destination is reached 340, processing returns to await the next user input 310. When the portable navigation device 104 is detected to be off the main route 342, operation switches to the first navigation operating mode 302 until the routelet data received 326 is applicable to the present location 318 to navigate the portable navigation device 104 back to the main route.

Thus, in accordance with the present invention, the first navigation operating mode consists of repeating the steps of transmitting a routelet request 324, receiving routelet data 326 and operating in accordance with the received routelet data 332 until routelet data is received 326 that is applicable to the present location to navigate the portable navigation device 104 back to the main route 318.

Figure 4:
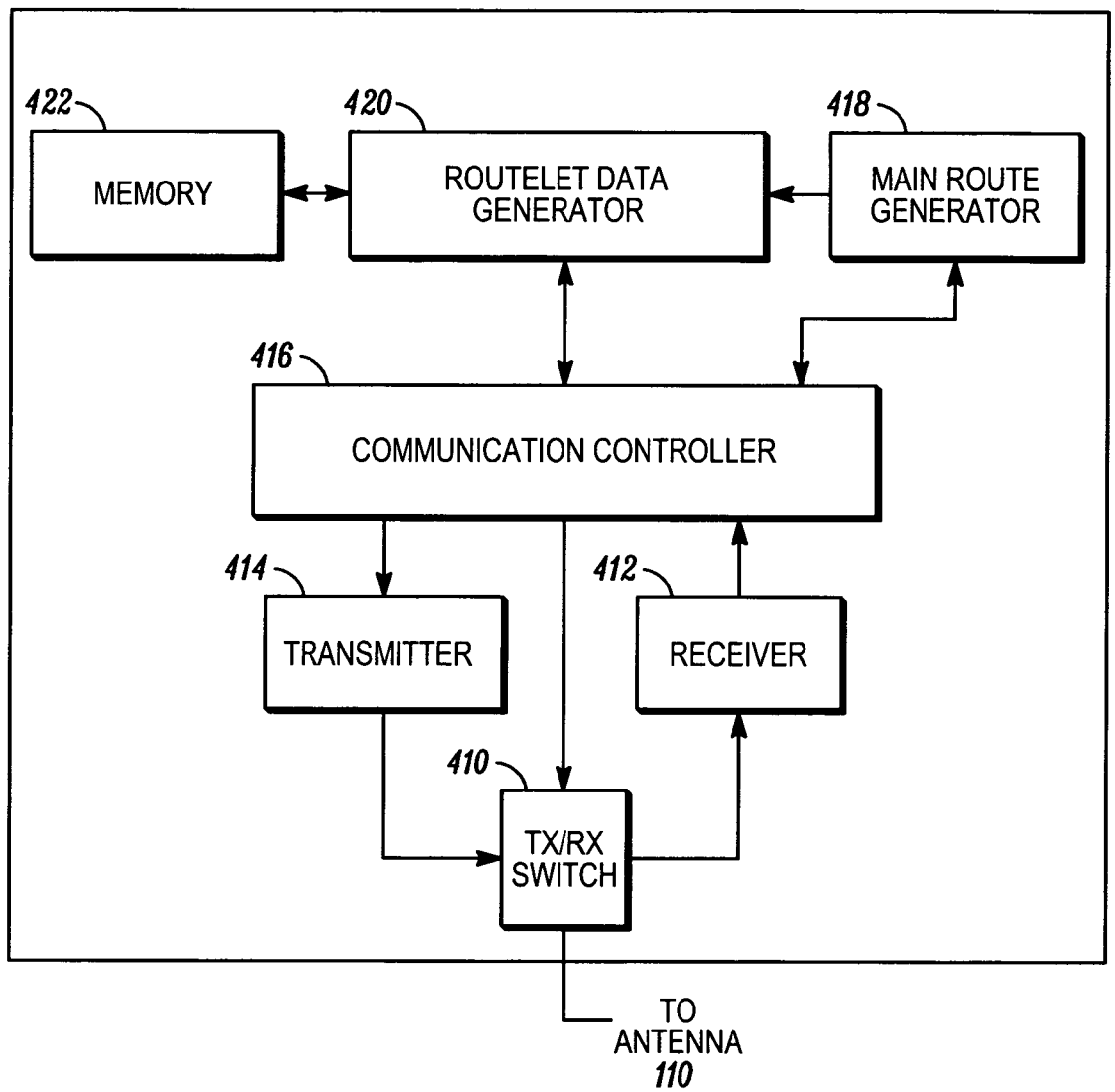
FIG. 4 is a block diagram of a remote navigation guidance device of the navigation guidance system of FIG. 1 in accordance with the embodiment.

Referring to FIG. 4, the antenna 110 (FIG. 1) is coupled to receive/transmit switch 410 of the remote navigation guidance device 102 for coupling and uncoupling receiver circuitry 412 and transmitter circuitry 414 thereto when antenna 110 is receiving and transmitting radio frequency (RF) signals. The receive/transmit switch 410 selectively couples the antenna 110 to the receiver circuitry 412 and the transmitter circuitry 414 in a manner familiar to those skilled in the art. The receiver circuitry 412 demodulates and decodes the RF signals to derive information therefrom and is coupled to a communication controller 416 for providing the decoded information thereto for utilization thereby in accordance with the function(s) of the remote navigation guidance device 102. The controller 416 also provides information to the transmitter circuitry 414 for encoding and modulating such information into RF signals for transmission from the antenna 110. A conventional main route generator 418 is coupled to the communication controller 416 for receiving navigation route requests, generating navigation route data describing a main route from a route start location, determined in response to received first location data, to a received destination location, and providing the navigation route data to the communication controller 416 for transmission via the transmitter circuitry 414. In accordance with the present invention, a routelet generator 420 is coupled to the communication controller for receiving routelet requests comprising location data, speed data and direction data and generating routelet data in response thereto. The routelet generator 420 is also coupled to the main route generator 418 for retrieving a main route from the main route generator 418. In addition, the main route generator 418 and the routelet generator 420 are coupled to signal the routelet generator 420 to generate initial routelet data for transmission with the navigation route data. Also, the main route generator 418 and the routelet generator 420 are coupled to a memory 422 having predetermined road information stored therein for utilization by the main route generator 418 and the routelet generator 420.

Figure 5:
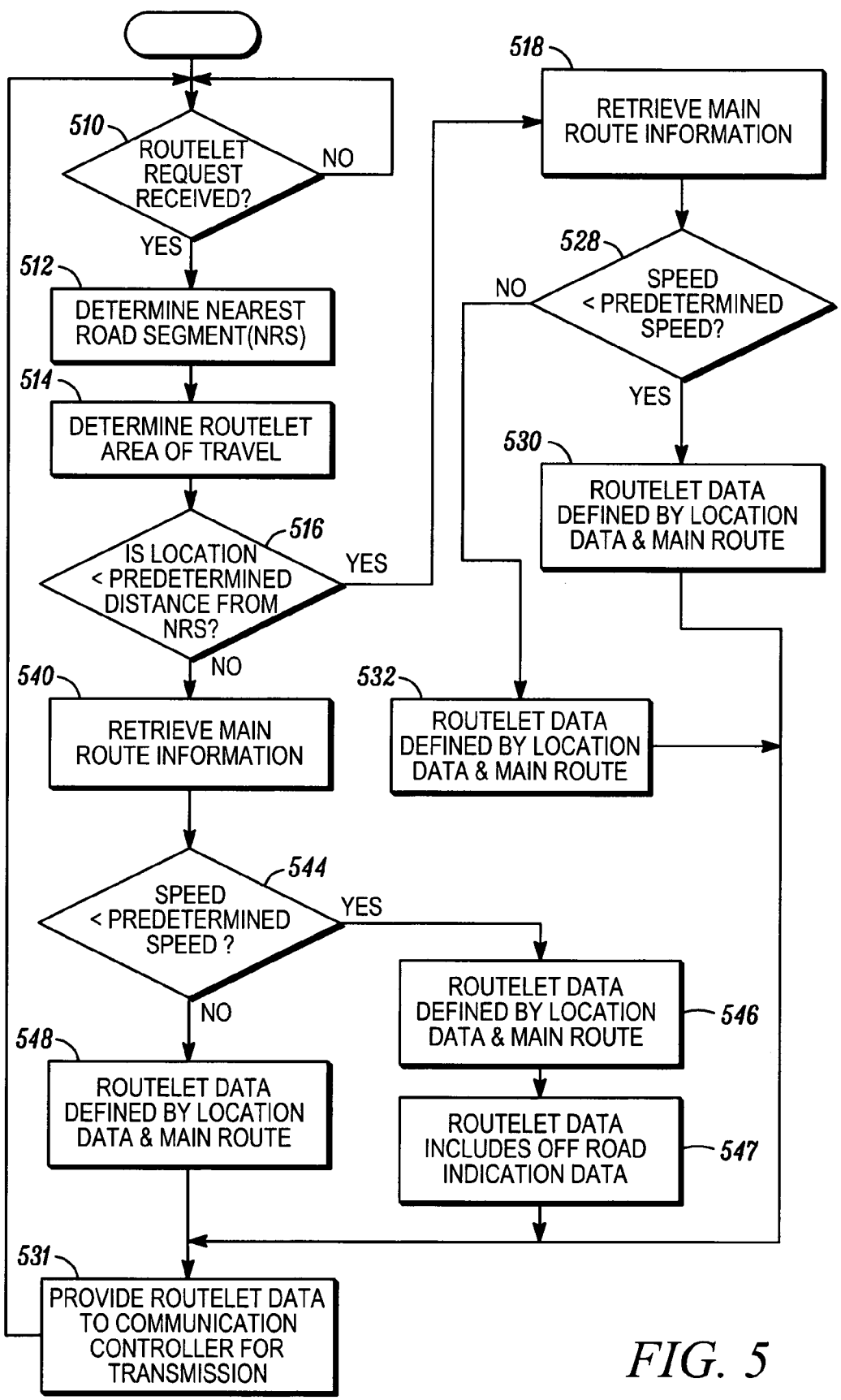
FIG. 5 is a flow diagram of the operation of the remote navigation guidance device of FIG. 4 in accordance with the embodiment.

Referring next to FIG. 5, operation of the routelet generator 420 begins by determining whether a routelet request has been received 510. When a routelet request is received 510, a nearest road segment to the portable navigation device 104 is determined 512 in response to location data in the received routelet request and predetermined road information stored in the memory 422. In addition, a routelet area of travel for the portable navigation device 104 is defined in response to the location data, the speed data and the direction data of the routelet request 514.

Next, it is determined whether the portable navigation device 104 is located on road or located off road in response to the location data indicating whether the portable navigation device 104 is less than a predetermined distance from the nearest road segment 516. The predetermined distance is determined by the constraints of the navigation guidance system, such as the error of the GPS location information, and could be as small as fifty meters. If the portable navigation device 104 is located on road 516, main route information is retrieved 518 from the main route generator 418 and processing determines whether the portable navigation device 104 is stationary in response to the speed data of the routelet request indicating that the portable navigation device is traveling at a speed less than a predetermined speed 528. The predetermined speed is established as a minimal speed to differentiate between movement and non-movement, such as four miles per hour.

If the portable navigation device 104 is stationary 528, then routelet data is generated for travel in the routelet area, the routelet data defined in response to the location data and the main route 530 and the routelet data is provided 531 to the communication controller 416 for transmission of the routelet data via the transmitter circuitry 414 (FIG. 4). If the portable navigation device 104 is moving 528 then routelet data is generated for travel in the routelet area, the routelet data defined in response to the location data and the main route 532 and then provided to the communication controller 416 for transmission 531.

When the portable navigation device 104 is located off road 516, the main route is retrieved 540 from the main route generator 418 and processing determines whether the portable navigation device 104 is stationary or moving 544. If the portable navigation device 104 is stationary 544 then routelet data is generated for travel in the routelet area, the routelet data defined 546 in response to the location data and main route data. Since the portable navigation device is determined to be off road 516 and stationary 544, the routelet data is further defined to include off road indication data 547. The routelet data is then provided to the communication controller 416 for transmission 531. If the portable navigation device 104 is moving 544, then routelet data is generated for travel in the routelet area, the routelet data defined in response to the location data and the main route 548 and then provided to the communication controller 416 for transmission 531.

In all instances, after transmission of the routelet data 531, processing returns to await the next routelet request 510. Thus it can be seen that the present invention provides routelet data to the portable navigation device 104 to begin initial maneuvering of the vehicle in all instances. The only indication to the user of an off road condition 547 is when the portable navigation device is off road 516 and stationary 544. The present invention, therefore, provides a method for timely and efficiently providing relevant routing data for route initiation and route maintenance through requesting and operating in accordance with routelet data. The portable navigation device 104 operates in the first operating mode, the "conversational" mode, in accordance with the routelet data during route initiation until the main route has been received and the portable navigation device is on the main route. In addition, the portable navigation device 104 operates in the first operating mode in accordance with the routelet data when deviating from the main route for efficient route maintenance until returning to the main route. When on the main route, the portable navigation device 104 operates in the second operation mode, a conventional method for navigation guidance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for navigation guidance in a distributed navigation guidance system comprising a portable navigation device having a first navigation operating mode for requesting and receiving routelet data and navigation route data and operating in accordance with the routelet data and a second navigation operating mode for operating in accordance with the navigation route data, the method comprising the steps of:
   in the first navigation operating mode, transmitting a navigation route request comprising first location data and a destination location, the first location data determined in response to a present location of the portable navigation device when the navigation route request is transmitted and transmitting a routelet request comprising second location data, speed data and direction data, wherein the second location data and the speed and direction data are determined in response to a present location, a present speed and a present direction of travel, respectively, of the portable navigation device when the routelet request is transmitted;
   receiving routelet data; and
   operating in accordance with the received routelet data, wherein operating in accordance with the received routelet data includes switching operation of the portable navigation device from the first navigation operating mode to the second navigation operating mode in response to the received routelet data intersecting a main route, the main route defined by received navigation route data comprising routing data describing the main route from a route start location determined in response to the first location data to the destination location.

2. The method for navigation guidance in accordance with claim 1 wherein the distributed navigation guidance system further comprises a remote navigation guidance device, the method further comprising the steps of:
   receiving the navigation route request at the remote navigation guidance device;
   the remote navigation guidance device generating the navigation route data;
   generating initial routelet data describing at least one routelet from the present location of the portable navigation device corresponding to the first location data to the main route; and
   transmitting the navigation route data and the initial routelet data to the portable navigation device.

3. The method for navigation guidance in accordance with claim 1 wherein the step of switching operation of the portable navigation device comprises the steps of:
   repeating the steps of transmitting a routelet request, receiving routelet data and operating in accordance with the received routelet data if the received routelet data is not applicable to the present location of the portable navigation device when the received routelet data is received; and
   switching operation of the portable navigation device from the first navigation operating mode to the second navigation operating mode in response to the received routelet data intersecting the main route.

4. The method for navigation guidance in accordance with claim 1 wherein the step of switching operation of the portable navigation device comprises the steps of:
   receiving navigation route data comprising routing data and received routelet data, the routing data describing the main route to navigate from the route start location to the destination location;
   switching operation of the portable navigation device from the first navigation operating mode to the second navigation operating mode in response to the received routelet data intersecting the main route.

5. The method for navigation guidance in accordance with claim 1 wherein the step of switching operation of the portable navigation device comprises the steps of:
   repeating the steps of transmitting a routelet request, receiving routelet data and operating in accordance with the received routelet data if the received routelet data is not applicable to the present location of the portable navigation device when the received routelet data is received or if the received routelet data does not intersect with the main route; and
   switching operation of the portable navigation device from the first navigation operating mode to the second navigation operating mode in response to the received routelet data intersecting the main route.

6. A method for navigation guidance of a portable navigation device in a distributed navigation guidance system comprising a remote navigation guidance device and the portable navigation device, the portable navigation device having a first navigation operating mode for requesting and receiving routelet data and navigation route data and operating in accordance with the routelet data and a second navigation operating mode for operating in accordance with the navigation route data, the method for navigation guidance of the portable navigation device comprising the steps of:
   the portable navigation device in the first navigation operating mode transmitting a routelet request comprising location data, speed data and direction data, wherein the location, speed and direction data is determined in response to a present location, a present speed and a present direction of travel, respectively, of the portable navigation device when the routelet request is transmitted;
   the remote navigation guidance device receiving the routelet request transmitted by the portable navigation device;
   the remote navigation guidance device generating routelet data in response to the location data, the speed data, the direction data and at least one primary travel road within a predetermined distance from the portable navigation device as indicated by the location data;
   the remote navigation guidance device transmitting the routelet data to the portable navigation device;
   receiving the routelet data at the portable navigation device; and
   the portable navigation device operating in accordance with the received routelet data.

7. The method for navigation guidance in accordance with claim 6 wherein the step of the remote navigation guidance device generating the routelet data comprises the steps of:

the remote navigation guidance device determining a nearest road segment to the portable navigation device in response to the location data and predetermined road information;

the remote navigation guidance device determining whether the portable navigation device is located on road or located off road in response to the location data and the nearest road segment; and the remote navigation guidance device generating the routelet data in response to whether the portable navigation device is located on road or located off road.

8. The method for navigation guidance in accordance with claim 7 wherein the step of the remote navigation guidance device determining whether the portable navigation device is located on road or located off road comprises the step of determining that the portable navigation device is located off road in response to the location data indicating that the portable navigation device is greater than or equal to a predetermined distance from the nearest road segment, and wherein the step of the remote navigation guidance device generating the routelet data comprises the steps of:

determining that the portable navigation device is stationary in response to the speed data indicating that the portable navigation device is traveling at a speed less than a predetermined speed; and generating the routelet data for travel in a routelet area defined in response to the location data, the speed data and the direction data, the routelet data defined in response to the location data and the nearest road segment if the portable navigation device is located off road and the portable navigation device is stationary, and wherein the routelet data further comprises off road indication data if the portable navigation device is located off road and the portable navigation device is stationary.

9. The method for navigation guidance in accordance with claim 7 wherein the step of the remote navigation guidance device determining whether the portable navigation device is located on road or located off road comprises the step of determining that the portable navigation device is located off road in response to the location data indicating that the portable navigation device is greater than or equal to a predetermined distance from the nearest road segment, and wherein the step of the remote navigation guidance device generating the routelet data comprises the steps of:

determining that the portable navigation device is moving in response to the speed data indicating that the portable navigation device is traveling at a speed greater than a predetermined speed; and generating the routelet data for travel in a routelet area defined in response to the speed data and the direction data, the routelet data defined in response to the location data, the nearest road segment and a main route if the portable navigation device is located off road and the portable navigation device is moving, wherein the main route defined in response to a route start location and a destination location.

10. The method for navigation guidance in accordance with claim 7 wherein the step of the remote navigation guidance device generating the routelet data further comprises the step of the remote navigation guidance device determining that the portable navigation device is stationary in response to the speed data indicating that the portable navigation device is traveling at a speed less than a predetermined speed, and wherein the step of the remote navigation guidance device generating the routelet data comprises the step of the remote navigation guidance device determining that the portable navigation device is located on road in response to the location data indicating that the portable navigation device is less than a predetermined distance from the nearest road segment, and wherein the step of the remote navigation guidance device determining whether the portable navigation device is located on road or located off road comprises the step of the remote navigation guidance device generating the routelet data for travel in a routelet area defined in response to the location data, the speed data and the direction data, wherein the routelet data is defined in response to the location data and a main route if the portable navigation device is located on road and the portable navigation device is stationary, and wherein the main route is defined in response to a route start location and a destination location.

11. The method for navigation guidance in accordance with claim 7 wherein the step of the remote navigation guidance device determining whether the portable navigation device is located on road or located off road comprises the step of determining that the portable navigation device is located on road in response to the location data indicating that the portable navigation device is less than a predetermined distance from the nearest road segment wherein the step of the remote navigation guidance device generating the routelet data comprises the steps of:

determining that the portable navigation device is moving in response to the speed data indicating that the portable navigation device is traveling at a speed greater than or equal to a predetermined speed; and generating the routelet data for travel in a routelet area defined in response to the speed data and the direction data, the routelet data defined in response to the location data and a main route if the portable navigation device is located on road and the portable navigation device is moving, wherein the main route is defined in response to a route start location and a destination location.

* * * * *